J. L. WOLF.
VEHICLE WHEEL.
APPLICATION FILED APR. 11, 1912.
1,070,570.
Patented Aug. 19, 1913.
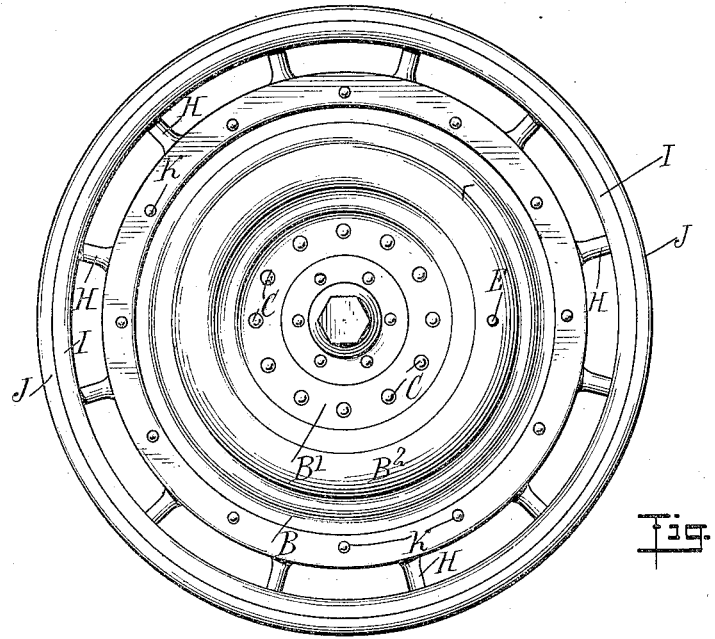
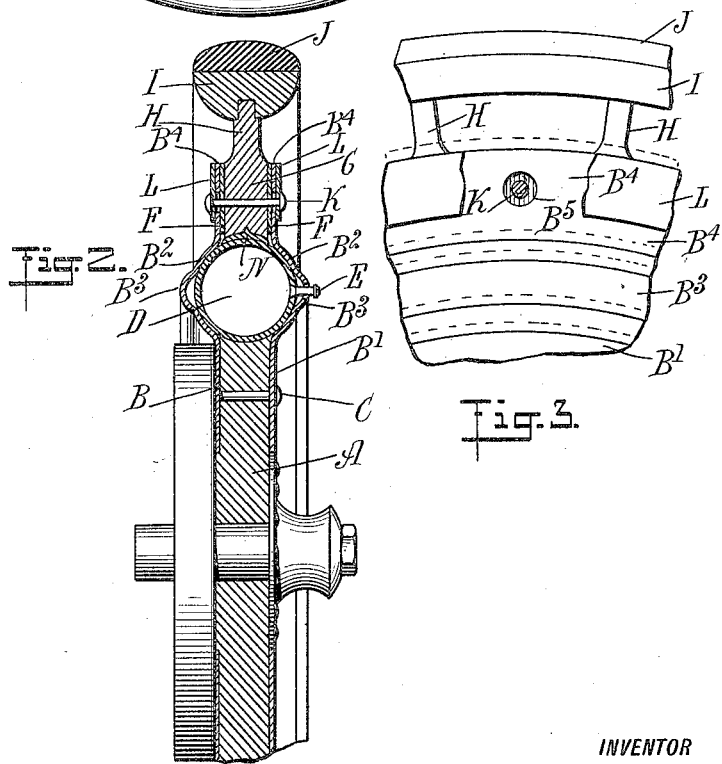
WITNESSES
INVENTOR
John Louis Wolf
BY
ATTORNEYS

UNITED STATES PATENT OFFICE.

JOHN LOUIS WOLF, OF NEW YORK, N. Y.

VEHICLE-WHEEL.

1,070,570.

Specification of Letters Patent. Patented Aug. 19, 1913.

Application filed April 11, 1912. Serial No. 690,094.

*To all whom it may concern:*

Be it known that I, JOHN LOUIS WOLF, a citizen of the United States, and a resident of the city of New York, borough of Manhattan, in the county and State of New York, have invented a new and Improved Vehicle-Wheel, of which the following is a full, clear, and exact description.

The object of the invention is to provide a new and improved vehicle wheel which is simple and durable in construction and provided with an inflatable tube to give the desired cushioning effect to the wheel, the tube being protected against being punctured when the wheel is in use.

For the purpose mentioned use is made of a wheel center provided with a protected seat for an inflatable tube engaged at its peripheral face by a ring and carrying spokes supporting a wheel rim, the said ring slidably engaging guideways forming an extended part of the said tube seat.

A practical embodiment of the invention is represented in the accompanying drawings forming a part of this specification, in which similar characters of reference indicate corresponding parts in all the views.

Figure 1 is a face view of the vehicle wheel; Fig. 2 is an enlarged transverse section of the same; and Fig. 3 is an enlarged face view of a portion of the wheel with part broken out and part in section.

The center of a vehicle wheel is provided with a body A, of wood or other material, and on the opposite sides of the body A are arranged side plates B, B' fastened in position on the body A by transverse rivets or bolts C, as indicated in the drawings. The outer portions $B^2$ of the side plates B, B' are curved outwardly in opposite directions so as to form with the peripheral face of the body A an annular seat for accommodating an inflatable tube D provided with a suitable valve E extending through one side portion $B^2$ to the outside to permit of applying a pump or other means for inflating the tube B to the full extent. The portions $B^2$ are provided with an outward bulging part $B^3$ so that when the tube D is subjected to pressure and is consequently flattened then such flattened portions can readily pass in the bulging parts $B^3$ thus allowing the inflatable tube D to yield under pressure within its protected seat.

From the side portions $B^2$ of the side plates B, B' extend parallel guide members $B^4$ engaged at the inner faces by friction plates F secured to the faces of a ring G provided with spokes H supporting the rim I provided with a suitable tire J of rubber or other suitable material. Pins or bolts K extend transversely through the ring G and friction plates F and pass loosely through openings $B^5$ in the guide members $B^4$, as plainly indicated in Figs. 2 and 3, and the outer ends of the said pins K support protecting rings L resting against the outer faces of guide members $B^4$ of the side plates B, B'. The inner edge of the hub G is provided with a shoe N seated on the peripheral face of the tube D so that when the wheel is in use and pressure is applied then the center of the wheel has bodily movement relative to the rim owing to the interposition of the inflatable tube D between the center and the rim.

It will be noticed that the inflatable tube D is completely incased and consequently is not liable to be punctured by nails or other extraneous means, and at the same time an exceedingly strong and durable connection is had between the center and the rim to prevent wabbling of the parts one relative to the other when the wheel is in use.

It is understood that the guide members $B^4$ engaging the friction plates F prevent lateral movement of the said hub and consequently the hub and the body A are at all times retained in the same plane to insure a proper running of the wheel.

Having thus described my invention, I claim as new and desire to secure by Letters Patent:

A vehicle wheel, comprising a center having a body provided with side plates curved outwardly to form with the peripheral face of the body an annular seat which is located at a point substantially midway between the center of the wheel and its periphery, the said plates being of sheet metal and extended beyond the curved portions to form an annular guideway, the extended portions of the plates having openings and the said curved portions having central side bulging parts, an inflatable tube in the said seat, a ring provided with friction plates slidingly engaging the said guideway, a shoe on the inner edge of the ring seated on the said tube, transverse pins held on the said ring and friction plates and extending loosely through the said openings, guard plates on the outer ends of the said pins and fitting against the outer faces of the said extended portions of the side plates, spokes extending from the said ring, and a rim held on the said spokes.

In testimony whereof I have signed my name to this specification in the presence of two subscribing witnesses.

JOHN LOUIS WOLF.

Witnesses:
HERMAN FEUCLERE,
EMLEY KIDDEN.

Copies of this patent may be obtained for five cents each, by addressing the "Commissioner of Patents, Washington, D. C."